United States Patent [19]

Drachenberg et al.

[11] 3,941,890

[45] Mar. 2, 1976

[54] METHOD OF MAKING SOY MILK

[76] Inventors: Frederick G. Drachenberg, 11674 Valverde, Riverside, Calif. 92505; Paul E. Allred, Box 373, Loma Linda, Calif. 92354

[22] Filed: Oct. 23, 1974

[21] Appl. No.: 517,057

[52] U.S. Cl. .................................. 426/46; 426/243
[51] Int. Cl.².. A23L 1/20; A23L 2/38; A23C 11/00
[58] Field of Search .............. 426/46, 190, 243, 241

[56] References Cited
UNITED STATES PATENTS

| | | | |
|---|---|---|---|
| 2,614,045 | 10/1952 | Learmonth | 426/241 |
| 3,399,997 | 9/1968 | Okumura et al. | 426/46 |
| 3,640,725 | 2/1972 | Sherba et al. | 426/46 |

*Primary Examiner*—James R. Hoffman
*Attorney, Agent, or Firm*—John H. Crowe

[57] ABSTRACT

A method of making soy milk from dehulled soy beans in which the beans are first cooked in a microwave oven for a long enough period of time to destroy the trypsin inhibitor present in such beans, but not long enough to roast the beans, and then mashing the microwave-cooked beans in a colloid mill with water at about 50°C to form a slurry. Suitable enzymes are incorporated in the slurry in sufficient quantities to either dissolve or substantially reduce in size particles of certain carbohydrate, proteinaceous and cellulose constituents of the slurry which would otherwise form sediment in the final product. The resulting slurry mixture is allowed to stand for half an hour, and then corn oil, sugar, flavoring agents, lecithin, sodium alginate and salt are added, in suitable amounts, to the slurry, which is then further processed in the colloid mill until it is converted into a relatively stable liquid suspension of emulsified oil and colloidal soy bean particles. This liquid suspension is then diluted with boiling water to the consistency of homogenized natural milk, and brought to a brisk boil. The boiled mixture is homogenized to produce a product having the appearance, taste and mouthfeel of homogenized cow's milk.

9 Claims, No Drawings

METHOD OF MAKING SOY MILK

BACKGROUND OF THE INVENTION

This invention relates generally to a method of making a milk-like beverage from soy beans, and more particularly to such a method which utilizes substantially all of the bean mass and results in the production of such a beverage with the appearance, taste and mouthfeel of homogenized natural milk.

It has long been known that soy beans possess proteinaceous, fatty, carbohydrate, and other, values that make them a prime raw material source for the preparation of various food items, including beverages, of which perhaps the principal example is a milk-like beverage often referred to as soy, or soya, milk. For centuries soy milk has been made from soy beans in the far East by a fairly simple process of forming an emulsion from the extracted fat and protein components of the beans. While this beverage has apparently been acceptable to the Oriental palate, Western man has found the flavor unpleasant, if not nauseous. However, the food value of soy milk is high, and for this reason many attempts have been made, over a great many years, to come up with a process of obtaining soy milk absent the unpleasant "soy" or "beany" taste so unpleasant to Westerners. All such processes of which we are aware involve the necessary removal of some of the nutritional components of soy beans and include various cooking, chemical treating, etc., steps to convert the beans to aqueous solution, or the like, form, mask or remove the beany taste in the final product, and provide a beverage as nearly as possible like real milk in taste and other qualities.

In certain instances, the de-oiled products of soy beans, and in other instances modified forms of the beans, such as, for example, full fat bean flakes, or bean flour, have been employed as starting materials for the production of soy milk. Regardless of the nature of the starting material, however, some of the soy bean mass, in certain cases in solid, and in other cases in liquified (whey) form, is always, to our knowledge, discarded or otherwise disposed of in the production of soy milk therefrom. This, of course, reduces the percentage of recovery of the starting material in the final product, and thereby increases the cost of that product.

As an indication of the many efforts to economically produce soy bean milk suited to the Western taste, various processes have, to our knowledge, been patented at least from as early as 1915 (U.S. Pat. No. 1,165,199 to Monahan et al.), to as late as May 1974 (U.S. Pat. No. 3,809,771 to Mustakas). One such patented process (U.S. Pat. No. 3,642,492 to Arndt) employs a mixture of sweet dairy whey and isolated soy protein which has been treated by a "dynamic physico-thermovapor flash treatment to remove objectionable flavors and odors." Another patented process (U.S. Pat. No. 3,288,614 to Miles) involves a number of treating steps including the homogenization of an "instant" slurry of flaked beans to avoid the bacterial contamination which allegedly takes place in an earlier process described in the patent in which a considerable percentage of the "finer edible content of the soy bean" is lost through discard with the "coarser fibers removed" in a centrifuging step of that (earlier) process. The latter patent claims a saving in raw material by comparison with said earlier process, but Miles' process still yields a slurry which is "clarified" in a centrifugal separator with resultant loss of the solid residue from that operation.

Those skilled in the art will readily appreciate that, as indicated above, presently known methods of producing soy milk involve numerous treating steps, some for the reduction, masking or elimination of the characteristically unpleasant beany taste of soy beans, and result in the recovery of only a part of the soy bean nutritive, and other, values with consequent waste of the remaining values and inflation of the selling price of the final product. Sometimes as much as 65 percent of the soy bean mass is lost to waste in soy milk producing processes heretofore known.

Since essentially the whole soy bean can be theoretically utilized for its nutritive, and other useful, values, so long as its beany taste can be eliminated in a harmless way without destruction of the food value of the bean, some way of converting the whole bean into pleasant tasting soy milk would be extremely useful, particularly in this modern era of emphasis on the use of health foods derived from natural vegetable sources.

SUMMARY OF THE INVENTION

We have now, in the process of this invention, provided a simple and inexpensive method of converting soy bean material into soy milk which can substantially utilize the entire bean mass and yield a product with no beany taste which closely resembles cow's milk in appearance, flavor, consistency and mouthfeel. The soy milk of our process can be produced from whole soy beans, full fat soy meal or grits, or solvent-extracted soy meal. In fact, any soy bean, or soy bean product from which the fats or oils have or have not been removed, can be utilized for purposes of our invention, any such material being hereinafter denoted, for reasons of simplicity, by the term "soy bean material."

In a preferred form for the preparation of a product closely resembling homogenized cow's milk, our process can be carried out by the following series of steps:

1. Heating soy bean material in a microwave oven for a long enough period to destroy the trypsin inhibitor therein (trypsin inhibitor is a natural substance in soy beans which gives them the characteristic beany taste referred to above), but for an insufficient length of time to roast the material.

2. Mashing or mixing the microwave-treated soy bean material with a sufficient quantity of warm water to form a slurry and adding minor amounts of enzymes in quantities sufficient to liquify or greatly reduce sizes of certain particles of carbohydrate, proteinaceous and cellulosic constituents of the starting material which would otherwise form a sediment in the final product.

3. Allowing the slurry with the incorporated enzymes to stand for a sufficient length of time to permit the enzymes to perform their intended function, but not so long as to permit them to hydrolyze or solubilize those constituents of the slurry which would not otherwise form a sediment in the final product.

4. Adding suitable amounts of vegetable oil, sugar, flavoring materials, salt, lecithin, and sodium alginate to the slurry after the enzymes have acted on it for the indicated (in step 3) period of time, and running the slurry with these added ingredients through a colloid mill.

5. Diluting the output of the colloid mill with boiling water to the consistency of homogenized cow's milk, then bringing the diluted mixture to a brisk boil, and allowing it to boil for one or two minutes. The purpose of this step is to deactivate the enzymes so that they produce no further liquifying, or size reduction, effect on the constituents of the diluted mixture.

6. Homogenizing the diluted mixture to give it a smoother quality and better mouthfeel than it would otherwise have. This step is, however, optional, since a satisfactory soy milk product can be produced without homogenization of the step (5) mixture.

Step (1), above, is a critically important feature of our process, since it results in the substantial elimination of any unpleasant beany taste in the final product. The length of time required for the microwave cooking of the soy bean material depends upon the nature of the latter. Where the whole bean is employed the cooking time must be long enough to permit full microwave penetration of the bean interiors so that the beans are cooked all the way through. The beans do not have to be dehulled prior to use in our process, although it is preferred that their hulls be removed since the latter contain small black spots which yield a slight amount of sediment in the finished product. The preferred cooking time for the whole soy bean is about 4 minutes, although this time can vary, as, for example, between about 3 and about 5 minutes, with generally satisfactory results. The cooking raises the temperature of the soy bean material to about 212°F (100°C) unless auxiliary heat is employed. We have found that the use of auxiliary heat is not necessary to our process, however. Where the soy bean starting material is in finely divided form, as in the case of whole fat soy bean flour, the cooking time will be much less than that required for the whole beans. We have found, for example, that a cooking time of 75 seconds is particularly suitable for use with such flour. Here again, however, the cooking time can vary between rather wide limits, such as, for example, between about 50 and about 100 seconds, the preferred range being between 60 and 80 seconds. Preferred cooking times for other soy bean materials can be easily determined by those skilled in the art, in the light of present teachings. In this connection, we have discovered that defatted soy bean meal can be heated for one minute in a microwave oven with good results, and the same thing is true of full fat soy grits. Overcooking (roasting) of the soy bean material must be avoided because, as those skilled in the art are aware, this makes the protein in the material insoluble, an undesirable result for reasons obvious from the teachings herein.

In step (2) of the preferred procedure outlined above, the most effective method of forming the slurry from the microwave-treated soy bean material from step (1) can vary, depending upon the nature of the starting material. Where the starting material is the whole bean, for example, a vigorous mashing or grinding procedure is a practical necessity, whereas in the case of a finely divided soy bean flour starting material, a less vigorous form of treatment will suffice. Where the material must be vigorously mashed or ground, this can be accomplished in any device suitable for the purpose. For instance, a Waring Blender or similar type of mixer can be employed, although we have found treatment in a colloid mill to be more effective. The warm water from which the slurry is formed should preferably, we believe, be at about 50°C, although its temperature can vary between limits of about 40° and something slightly less than 70°C, since the enzymes incorporated in the slurry are deactivated at the latter temperature. A preferred range of water temperatures is from about 45° to about 55°C.

The aforesaid enzymes can be incorporated in the slurry in any suitable manner. For example, they can be added to the water prior to its admixture with the soy bean material, or they can be mixed with the slurry as it is being formed, or after it is formed, in the blender, colloid mill, or other suitable mixing device. As previously indicated, the purpose of these enzymes is to act on grainy constituents of the soy bean material, as by hydrolysis, to either liquify them or reduce their size range, so that they will not settle out and form a sediment in the finished product. Since, in most cases, there are carbohydrate, proteinaceous, and cellulosic constituents of a grainy character in the soy bean material, separate enzymes capable of reacting selectively with these various constituents must, for best effect, be employed. Numerous enzymes capable of producing the desired results are known to those skilled in the art. Of the proteolytic enzymes (those capable of hydrolyzing proteins) we prefer to employ proteolase. Amylase and cellulase, we have found to be particularly suitable for solubilizing, or rendering suspensible, carbohydrate and cellulose constituents of the soy bean material. While the proportions of microwave-cooked soy bean material and warm water can vary within the scope of our invention, we have found a ratio of 150 grams of the former to 300 milliliters of the latter preferred for the formation of a slurry of the proper consistency for our purpose. Only minute amounts of the enzymes are required, for example from 0.1 to 0.25 (preferably one-fifth) gram of each per 150 grams of soy bean material being adequate, we have found, for purposes of our process. One skilled in the art could quite readily determine the best proportion of each enzyme employed, from the present teachings, and these quantities could perhaps vary somewhat from the preferred range given above.

The enzymes are left in the slurry in viable form for a sufficient period of time to act on the grainy, or sedimentary, constituents of the soy bean material, but no longer than necessary to accomplish this goal, since as long as they are present in active form they will continue to solubilize other comstituents of the slurry, to seriously detract from the quality of the product. Generally speaking, this length of time can vary from about 15 minutes to 2 hours, although a preferred time range is from about 25 minutes to 1 hour. If they are present for a period of less than 15 minutes, insufficient solubilizing action takes place, and if they are allowed to remain active for more than about 2 hours, they will attack too many of the desirable constituents of the mixture. A particularly optimum reaction time for the enzymes, we have discovered, is about half an hour. We prefer to allow the slurry to remain quiescent for the selected period for the action of the enzymes, although this is not necessary, and the mixture can be continually stirred, or otherwise agitated, while the enzyme action is taking place. Although we have found enzymes to serve our purpose very well, there are certain acid, alkali, or other reagents which could be used for the same effect, and we consider the employment of any such reagents within the scope of our invention.

After the enzymic action has been allowed to take place in the slurry, the various additives necessary to impart the proper appearance, taste, mouthfeel, etc., to the product, are preferably added, at substantially the same time as indicated in step (4) above, and the overall mixture is then passed through a colloid mill to comminute substantially all of its solid particles to the desired colloidal fineness and blend all of the ingredients so as to form an emulsified liquid with colloidally suspended particles of similar character to concentrated natural milk. The degree of fineness of the colloidal particles can be readily determined by one skilled in the art by a simple taste test, and the preferred time of colloidal treatment depends upon such factors as the size of the colloid mill and the separation setting in the mill. We have found, for example, that a separation of about 0.002 inch is preferred to yield a smooth colloidal suspension similar to natural milk.

The vegetable oil additive can be any commercially available, edible vegetable oil, such as soy bean or corn oil, as well as any edible hydrogenated vegetable oil such as exemplified by Crisco shortening, manufactured by Procter and Gamble. Corn oil is preferred, and should be added in an amount sufficient to yield a product of similar fat content to natural milk. In this connection, we have found that 110 ml. of oil per gallon of milk made from the slurry of 150 grams of soy bean material and 300 ml. of water referred to above produces a product similar to homogenized cow's milk in fat content. If more oil than this is used, the product, we have found, is too oily to serve as a suitable milk substitute, but less oil could be used if a product similar to defatted, or non-fat, natural milk is desired. Where defatted soy bean material is employed in lieu of whole fat soy bean material, the amount of added vegetable oil can be increased by about 20%, although this is not necessary since a satisfactory product can be made without such an increase. If the amount of vegetable oil is decreased from 110 ml. to 75 ml. per gallon of final product, a palatable milk is produced, but any amount significantly less than this results in a product too watery for the average taste.

The sugar is added to the mixture as a sweetener, and can be any of the known sugars, such as, for example, sucrose, dextrose, lactose, or a mixture thereof. We prefer to use sucrose, and have found from 60 to 75 grams per gallon of finished milk to be a preferred range of quantities for purposes of our invention. In most cases, about 70 grams per gallon, we have discovered, approximates the sweetness of cow's milk very closely.

The lecithin serves primarily as an emulsifier to hold the oil in suspension in the final product. Additionally, lecithin is a healthful derivative of soy beans, which adds nutritive value to the soy milk. The presence of an emulsifier, of which lecithin is preferred, in the milk is necessary to prevent oil separation therein. Sodium alginate is also an emulsifier, but, additionally, it serves as a colloidant to hold colloidal particles from the soy bean material in suspension in the soy milk. Thus, both lecithin and sodium alginate are suspending agents in the sense that they prevent separation of the oil and solid particles (as sediment) from the milk. While sodium alginate is preferred colloidant for purposes of our invention, any equivalent reagent might be used which serves the same purpose, or used in admixture with the alginate if desired. An example of such a colloidant is polyethylene sorbitan monostearate. Both lecithin and sodium alginate are vulnerable to the action of enzymes, hence the time of addition of each to the material undergoing processing treatment is somewhat critical, since if either is added too soon, its effectiveness will be destroyed by the enzymes in the mixture. In spite of the fact that enzymes are present at the time of addition of the lecithin and sodium alginate in step (4) of the above-described process, the enzymes remain active for only a relatively short period thereafter, since they are destroyed on contact with the boiling water of step (5), and therefore their presence has little deleterious effect on those agents in this case. Only minute amounts of lecithin and sodium alginate are required, about one-half gram of each per gallon of milk made in accordance with the present process being entirely adequate, we have discovered. In any event, any skilled milk or soy bean chemist can easily determine the optimum amounts of lecithin and sodium alginate to add for best effect in any particular batch or stream of milk produced in accordance with present teachings. In addition to its other benefits, lecithin is a rich source of phosphorus and vitamin E for our soy milk product. While soy milk can be made without the use of sodium alginate or its equivalent, since the soy bean material is finely divided in a colloid mill as a critical part of our process, the addition of the sodium alginate (or its equivalent) is highly desirable since it significantly increases the mouthfeel of the product. In other words, if the sodium alginate is omitted, the product will generally have a slightly watery character, rather than a smooth mouthfeel such as that of natural milk.

The preferred flavoring ingredients of the method of our invention are vanilla extract and so-called milk flavor. Only very small quantities of these agents are required, a couple of drops of each per gallon of milk being adequate in most cases. In any event, a skilled chemist would have no difficulty in determining the proper quantity of each for any given batch or stream of material undergoing processing treatment. The addition of too much vanilla extract will obviously result in an unnatural vanilla taste in the final product.

"Milk flavor" is a liquid material, known generically under that term, containing the principal components of animal milk which give the latter its characteristic flavor (butyric acid, acetones, etc.) in highly concentrated form, which can be added to synthetic milk productx to impart a milk-like taste thereto. A milk flavor particularly suitable for our purpose is manufactured in Mexico by Lucta Co., and sold under the name Lechearoma.

The salt is added for flavor balance, only a small quantity, such as, for example, about 1 gram per gallon of milk being required. Again, one skilled in the art will be able to adjust the amount of salt necessary to achieve the desired taste effect in the soy milk product with no difficulty.

While, as indicated, the time of addition of the sodium alginate and lecithin to the soy bean material being processed must be such as to obviate the destruction of those substances by enzymes present in the mixture, the salt, vanilla extract and milk flavor can be added at any stage of the process. This is true, even though vanilla extract and milk flavor are somewhat volatile, and for this reason, they could, if desired, be mixed into the material after the slurry has been diluted with hot water, then brought to a boil, to avoid volatilization thereof at boiling water temperature. We have discovered however, that so little of the vanilla extract and milk flavor are lost in this diluting and boiling step that it is an unnecessary precaution to hold off on the addition of those flavoring agents until after the boiling operation is completed. Consequently, for most efficient operation of the process, it is preferred that all of the step (4) additives be incorporated in the slurry at substantially the same time, as indicated in that step. Where the diluted mixture from step (5) is homogenized, this can be done at normal milk homogenization pressure (about 1500 psi) or under high pressure conditions (such as, for example, from 6000 to 8000 psi). The amount of boiling water used to dilute the slurry from step (4), where the preferred quantities of ingredients set forth above are employed, is sufficient to make up one gallon of milk product. Where the step (6) homogenization is carried out, as we prefer to do for the smoother mouthfeel it gives the product, any suitable commercial homogenizer, such as, for example, a Cherry Burrell homogenizer (manufactured by Cherry Burrell Co.) or a Manton Gaulin homogenizer will suffice for the purpose. The latter has two stages, and can therefore be utilized for high pressure homogenization, but low pressure homogenization can be carried out in a Cherry Burrell homogenizer, and this yields a satisfactory product in accordance with our invention and could therefore be employed in a commercial operation for the production of soy milk.

Some soy milk has a tendency to form a sediment in the form of a brown ring near the bottom of its container, the chemical identification of which has not, as yet, been determined. We have discovered, however, that the incorporation of a minor amount of dicalcium phosphate to our soy milk prevents the formation of this brown ring. Additionally, dicalcium phosphate adds both calcium and phosphorus to the soy milk, and this is desirable, since soy milk is characteristically lower in these values than natural milk such as cow's milk. While the process of our invention is intended primarily to yield a product similar in all significant respects t homogenized cow's milk, it could, of course, by judicious selection of the ingredient proportions, be made similar to other animal milk, such as, for example, human milk.

It is thus a principal object of this invention to provide an economical process for the preparation of soy milk similar in taste, consistency and mouthfeel to homogenized cow's milk absent the characteristic beany flavor of soy beans and with substantially no waste of any of the mass of the soy bean starting material.

It is another object of the invention to provide such a method for the manufacture of soy milk from soy beans in whole form or after they have been converted to soy bean flour, defatted soy grits, soy flakes, or the like materials.

Other objects, features and advantages of the invention will become apparent in the light of subsequent disclosures herein.

DESCRIPTION OF PREFERRED EMBODIMENTS

The following examples illustrate methods of making soy milk in accordance with this invention from various types of soy bean starting materials. It should, of course, be understood that these examples are included for illustrative purposes only and that the invention is not limited to the particular combinations of materials, conditions, proportions, etc., set forth therein.

EXAMPLE I

In this example, soy milk in accordance with this invention was prepared from whole soy beans.

150 grams of soy beans were heated in a microwave oven for 4 minutes. The microwave-heated soy beans were then blended with 300 ml. of water, at 50°C, to which one-fifth grams each of cellulase, protcolase, and amylase had been added, for 2 minutes. The resulting slurry was allowed to stand for about half an hour, then 110 ml. of corn oil, 4 tablespoons of sucrose, one-half teaspoon of salt, one-half teaspoon of vanilla extract, one-fourth teaspoon of sodium alginate and one-fourth teaspoon lecithin were added and the resulting mixture was run through a colloid mill for three minutes. The slurry from the colloid mill was then dispersed in enough boiling water to make one gallon of mixture. The mixture was brought to a brisk boil, and maintained thereat for 2 minutes. The boiled material was then homogenized in a Cherry Burrell homogenizer after the addition of 2 drops of Lechearoma milk flavor. After cooling, the product closely resembled cow's milk in taste, flavor, and consistency. No sediment had settled and it had no beany taste.

EXAMPLE II

This is an example similar to Example I, except that whole fat soy bean flour was employed instead of whole soy beans. The procedure described in Example I was otherwise followed, except that the flour was heated in the microwave oven for 75 seconds, instead of 4 minutes. The product was excellent in taste, flavor and consistency. No sediment settled on the bottom of the container.

EXAMPLE III

This example is similar to Example I, except that defatted soy meal (50% protein) was substituted for the whole soy beans, and the meal was heated for one minute, instead of 4 minutes, in the microwave oven. The taste and flavor of the product was very good.

EXAMPLE IV

This example, likewise, was similar to Example I, except that whole fat soy grits were processed through an extruder, to form granules, which were ground into a fine powder in an Alpine mill, and 150 grams of this powder was substituted for the whole soy beans of Example I. Otherwise, the procedure was the same as described in Example I, except that heating in the microwave oven was for one minute instead of 4 minutes. The product was very good, with an exceptionally white color.

While the novel method of making soy milk, and the soy milk product, of this invention have been herein described in what are considered to be preferred embodiments, it will be appreciated by those skilled in the art that various departures may be made therefrom within the scope of the invention. Some of these departures have already been mentioned, and others will occur to those skilled in the art in the light of present teachings. In summary, the scope of the invention extends to all variant forms thereof encompassed by the language of the following claims. To avoid any misunderstanding as to the import of the term "vegetable oil material," as employed in the claims, that term is intended to include within its meaning, in addition to the individual vegetable oils disclosed specifically and generically above, the hydrogenated vegetable oils also disclosed and mixtures of said vegetable oils, hydrogenated vegetable oils and/or both.

What we claim is:

1. A method of making soy milk comprising the steps of:

cooking soy bean material with microwaves for a sufficient length of time to substantially destroy the trypsin inhibitor known to be present therein without causing any appreciable roasting of said material;

dispersing the microwave-cooked material in relatively finely divided form in a sufficient quantity of warm water at a temperature less than 70°C to form a slurry and incorporating in the slurry, in any suitable manner, a sufficient quantity of suitable enzymic material, its equivalent or a mixture thereof to act upon any proteinaceous, carbohydrate and cellulosic constituents of the microwave-cooked material which would otherwise form a sediment in the final soy milk product in such fashion as to substantially prevent those constituents from forming said sediment;

providing sufficient time to permit said enzymic material, its equivalent or a mixture thereof to act upon said proteinaceous, carbohydrate and cellulosic constituents to convert them to such form as to obviate ultimate sedimentation thereof in said final soy milk product without causing any substantially deleterious effect on other constituents of the microwave-cooked material;

treating said slurry to substantially reduce the size range of its particles to colloidal size range;

diluting the treated slurry with hot water and subjecting the diluted mixture to boiling action to put an end to any further action of the enzymic material, its equivalent, or mixture thereof on the constituents of the diluted slurry; and appropriately incorporating in the body of material undergoing processing treatment in accordance with the foregoing steps edible vegetable oil material, sugar, flavoring material and suspending agent material in quantities adequate to impart qualities of taste and mouth feel similar to those of natural milk to the final product, the proportions of soy bean material, water, and vegetable oil material employed being such as to insure a product having substantially the consistency of natural milk in its homogenized, or other commercially altered, form.

2. A method in accordance with claim 1 in which the temperature of said warm water is in excess of 40°C; said enzymic material, its equivalent or a mixture thereof comprises suitable enzymes; said edible vegetable oil material is edible vegetable oil; said flavoring material includes milk flavor; and said suspending agent material comprises at least one suitable emulsifier.

3. A method in accordance with claim 2 in which sufficient time is provided to permit the enzymes to act upon said proteinaceous, carbohydrate and cellulosic constituents by allowing the slurry containing said enzymes to stand for from 15 minutes to 2 hours prior to treatment of the slurry to substantially reduce the size range of its particles to colloidal size range; said flavoring material includes vanilla extract in addition to milk flavor; and said hot water is water at substantialy boiling temperature.

4. A method in accordance with claim 3 in which said warm water is at a temperature of from about 45°C to about 55°C; the edible vegetable oil, sugar, flavoring material and suspending agent material additives are incorporated in said slurry just prior to its treatment to substantially reduce the size range of its particles to colloidal size range; and the boiled mixture is subsequently homogenized.

5. A method in accordance with claim 4 in which is incorporated as a flavor balancing additive, a minor quantity of salt.

6. A method in accordance with claim 5 in which said enzymes are proteolase, amylase and cellulase; said edible vegetable oil is corn oil; and said suspending agent material comprises lecithin and a material selected from the group consisting of sodium alginate, polyethylene sorbitan monostearate and a mixture thereof.

7. A method in accordance with claim 6 in which the material selected from the group sonsisting of sodium alginate, polyethylene sorbitan monostearate and a mixture thereof is sodium alginate.

8. A method in accordance with claim 7 in which a minor amount of dicalcium phosphate is incorporated in the mateerial undergoing processing treatment at a suitable stage of processing.

9. A method in accordance with claim 7 in which the soy bean material comprises dehulled soy beans; the cooking time of the dehulled soy beans with microwaves is within the range from about 3 to about 5 minutes; the relative proportions of dehulled soy beans and warm water employed in said method is equivalent to about 150 grams of the beans to 300 milliliters of the water; the microwave-cooked beans are dispersed in the warm water to form said slurry by means of a colloid mill; and the nature and relative quantity of each substance employed in said method in addition to said dehulled soy beans and said warm water are such as to yield a soy milk product similar in essential qualities to cow's milk.

* * * * *